(12) United States Patent
Macours

(10) Patent No.: US 9,947,186 B2
(45) Date of Patent: Apr. 17, 2018

(54) HAPTIC FEEDBACK CONTROLLER

(71) Applicant: NXP B.V., Eindhoven (NL)

(72) Inventor: Christophe Marc Macours, Hodelge (BE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/372,809

(22) Filed: Dec. 8, 2016

(65) Prior Publication Data

US 2017/0169674 A1    Jun. 15, 2017

(30) Foreign Application Priority Data

Dec. 10, 2015 (EP) .................................. 15199089

(51) Int. Cl.
 H04B 3/36      (2006.01)
 G08B 6/00      (2006.01)
 H04M 19/04     (2006.01)
(52) U.S. Cl.
 CPC ............ *G08B 6/00* (2013.01); *H04M 19/047* (2013.01)
(58) Field of Classification Search
 CPC combination set(s) only.
 See application file for complete search history.

(56) References Cited

U.S. PATENT DOCUMENTS

| 6,738,489 B2* | 5/2004 | Chung | H04R 9/06 340/407.1 |
| 2010/0153845 A1* | 6/2010 | Gregorio | G06F 3/016 715/702 |
| 2012/0229264 A1* | 9/2012 | Company Bosch | G06F 3/016 340/407.1 |
| 2017/0111734 A1* | 4/2017 | Macours | H04R 3/005 |

OTHER PUBLICATIONS

Extended European Search Report for Patent Appln. No. 15199089.2 (dated May 31, 2016).
Precision Microdrives; "Linear Resonant Actuators—LRAS"; retrieved from the internet http://www.precisionmicrodrives.com/vibrating-vibrator-vibration-motors/linear-resonant-actuator-lra-haptic-vibration-motors; 7 pages (Dec. 6, 2016).

* cited by examiner

*Primary Examiner* — Travis Hunnings

(57) ABSTRACT

A haptic feedback element controller for a mobile device and a method of controlling a haptic feedback element for a mobile device is described. The haptic feedback element includes a processor having a processor output, a first processor input, and a second processor input, a control state module having an output coupled to the second processor input and configured to determine at least one operating state parameter of at least one of a haptic feedback element and a haptic feedback element amplifier; wherein the processor is configured to alter the amplitude of one or more frequency components of an input signal received on the first processor input in dependence of the at least one operating state parameter and to output a processed signal to a haptic feedback element amplifier having an output for coupling to a haptic feedback element. The haptic feedback element controller may maximize the drive signal up to mechanical and thermal limits without lifetime reduction of the haptic feedback element.

15 Claims, 4 Drawing Sheets

HAPTIC FEEDBACK CONTROLLER

CROSS-REFERENCE TO RELATED APPLICATIONS

This application claims the priority under 35 U.S.C. § 119 of European patent application no. 81693241US03, filed Dec. 10, 2016 the contents of which are incorporated by reference herein.

This disclosure relates to a haptic feedback element controller for a mobile device and a method of controlling a haptic feedback element for a mobile device.

Many mobile devices such as mobile phones make use of haptic motors as haptic feedback elements for generating vibration alerts or more complex haptic patterns to enhance man-device interaction. Haptic motors used in mobile phones typically make use of AC-driven Linear Resonant Actuators (LRAs) or DC-driven Eccentric Rotating Mass (ERM) motors. Both LRAs and ERMs work using an electrodynamic principle of operation.

For an LRA a magnetic field is typically generated by a voice coil which interacts with a magnet connected to a "mass" typically formed from a metal, which are suspended on a spring. As the magnetic field varies with the applied drive signal, the magnet and mass are moved up and down as they interact with the spring. The moving mass generates vibrations, as opposed to a loudspeaker where a moving cone (or membrane) is generating sound pressure waves. The interaction between the LRA spring and mass results in a resonant behaviour. The resonant frequency is typically in the range between 150 Hz and 250 Hz, the latter being the peak human skin sensitivity frequency. The perceived haptic force is dependent on the drive signal level, which is usually a sinewave at the resonant frequency.

An ERM typically consists of a DC motor including an inductive coil or voice coil which generates a magnetic field causing the motor shaft to rotate. An eccentric mass usually formed from a metal is connected to the motor shaft. Because the mass is eccentrically mounted on the motor shaft the rotation will result in a vibration. The ERM motors used for mobile devices will typically rotate at frequencies above 10,000 RPM and operate at a fixed DC voltage typically around 3 volts.

Various aspects of the invention are defined in the accompanying claims. In a first aspect there is defined a haptic feedback element controller for a mobile device comprising a processor having a processor output, a first processor input, and a second processor input, a control state module having an output coupled to the second processor input and configured to determine at least one operating state parameter of at least one of a haptic feedback element and a haptic feedback element amplifier wherein the processor is configured to alter the amplitude of one or more frequency components of an input signal received on the first processor input in dependence of the at least one operating state parameter and to output a processed signal to a haptic feedback element amplifier having an output for coupling to a haptic feedback element.

The haptic feedback controller may process the input drive signal based on the haptic feedback element operating state parameter and/or haptic feedback element amplifier operating states. The processor may be configured to protect the haptic feedback element amplifier and/or haptic feedback element or haptic motor by maintaining the respective operating state parameter states within safe limits.

In embodiments the processor may be configured to increase the amplitude of one or more frequency components of an input signal in response to the at least one operating state parameter being less than a first predetermined value and to decrease the amplitude of one or more frequency components of an input signal in response to the at least one operating state parameter being greater than a second predetermined value.

The processor may maximize the haptic feedback element output and/or haptic feedback element amplifier output by boosting the input signal until one or more of the operating state parameters have reached their respective safe limits. The processor may apply a time-varying gain or a frequency dependent gain. The haptic feedback element controller may maximize the drive signal up to mechanical and thermal limits without lifetime reduction of the haptic feedback element.

In embodiments, the haptic feedback element controller may further comprise a bandwidth extension module coupled to the processor, wherein the bandwidth extension module is configured to extend the effective pass-band of the haptic feedback element to include frequencies above and below the resonant frequency of the haptic feedback element.

In embodiments of the haptic feedback element controller the bandwidth extension module may be further configured to adapt the effective pass-band in response to a change in resonant frequency of the haptic feedback element.

A bandwidth extension module may apply a filter to increase the effective bandwidth of a haptic feedback element such as a linear resonant actuator in order to reproduce a broader range of frequencies. The filter can be fixed or adaptive to for example LRA mechanical parameters such as Q factor and resonant frequency.

In embodiments of the haptic feedback element controller the processor may comprise a processor acoustic transducer input and wherein the processor is configured to alter the input signal in response to frequency components outside the effective pass-band of the haptic feedback element being detected in a signal received via an acoustic transducer coupled to the processor acoustic transducer input.

Embodiments may include a distortion detector having a first input for receiving a signal from a haptic feedback element amplifier, a second input for receiving a signal from an acoustic transducer and an output coupled to the processor acoustic transducer input, and wherein the distortion detector is operable to generate an output signal from a comparison between an acoustic transducer signal and the haptic feedback element amplifier signal.

An acoustic signal detected via an acoustic transducer, for example a microphone or a speaker configured as a microphone may be used by the processor to adjust a filter response and/or the protection thresholds to account for example for the variable mechanical coupling of the device with a surface on which a device is placed. A distortion detector may be included which compares an acoustic transducer signal and the haptic feedback element amplifier signal and generates a distortion signal from the comparison.

In embodiments, the haptic feedback element controller may comprise a voltage-current sensor having an output coupled to the control state module and an input for sensing a voltage and/or current from a haptic feedback element amplifier output and wherein the control state module is configured to determine a value of the at least one operating state parameter from the sensed voltage and/or current.

The states of a haptic feedback element, for example a haptic motor such as an LRA or ERM and/or haptic feedback element amplifier states may be determined and updated from electrical measurements made across the haptic motor terminals. Monitoring the driving voltage and/or current enables: the calculation of the motional impedance of the motor from its back-electromotive force (BEMF). This allows the estimation of the motor displacement and the corresponding force, the measurement of the voice coil DC resistance, which can be used to estimate the voice coil temperature, the calculation of the output current and voltage, and the corresponding driving power. The haptic motor and/or amplifier states may also be determined using the input signal and (non-) linear feedforward models. In this case, the voltage and current signals may be used to update the model parameters. By updating the model with values from the voltage and current signals, the model may be adapted to account for manufacturing tolerances, environmental conditions, for example ambient temperature and also aging effects. For example, for a haptic feedback element such as a linear resonance actuator, the actual resonance frequency may vary for example by 10 to 20%. By updating the model, from voltage and/or current measurement, the exact resonant frequency may be determined and other parameter e.g. drive signal and filter coefficients may be adjusted to account for the actual resonant frequency.

In embodiments, the at least one operating state parameter may comprise at least one of haptic feedback element resonant frequency, peak amplifier current, peak output voltage, peak amplifier power, average amplifier power, haptic element voice coil temperature, peak power dissipated in the haptic element voice coil, haptic element mass displacement, and force applied to the haptic element mass.

In embodiments of the haptic feedback element controller the control state module may be configured to determine at least one of the haptic element mass displacement and the force applied to the haptic element mass from the determined voltage and/or current.

In embodiments of the haptic feedback element controller the control state module may be configured to determine the voice coil DC resistance of the haptic feedback element from the determined voltage and/or current and to determine a value of the voice coil temperature from the voice coil DC resistance.

In embodiments of the haptic feedback element controller the processor may be configured to generate a constant frequency and constant amplitude signal having a frequency other than the resonant frequency of the haptic feedback element and wherein the control state module is configured to determine the voice coil DC resistance of the haptic feedback element from the determined voltage and/or current and to determine a value of the voice coil temperature from the voice coil DC resistance.

In embodiments of the haptic feedback element controller the processor may be configured to alter the amplitude of one or more frequency components of an input signal received on the first processor input to limit the force to a predetermined maximum value.

In embodiments of the haptic feedback element controller the control state module may further comprise a haptic feedback element amplifier state module configured to determine the value of at least one of peak amplifier current, peak output voltage, peak amplifier power, and average amplifier power and a haptic feedback element state module configured to determine the value of at least one of resonant frequency, voice coil temperature, peak power dissipated in the voice coil, mass displacement, and force applied to the mass.

In embodiments of the haptic feedback element controller, the control state module may be coupled to the first processor input and further comprise a model of at least one of the haptic feedback element and the haptic feedback element amplifier for calculating an estimated value of the at least one operating parameter from an input signal received on the first processor input.

In embodiments the haptic feedback element controller maybe incorporated into a mobile device which may further comprise a haptic feedback element amplifier, and a haptic feedback element, wherein the haptic feedback element controller is coupled to the haptic feedback element amplifier input and the haptic feedback element is coupled to the haptic feedback element amplifier output.

In a second aspect there is described a method of controlling a haptic feedback element the haptic feedback element being operably driven by a haptic feedback element amplifier, the method comprising determining at least one operating state parameter; altering the amplitude of one or more frequency components of an input signal received on the first processor input in dependence of the at least one operating state parameter; and outputting the processed signal to the haptic feedback element amplifier.

BRIEF DESCRIPTION OF DRAWINGS

In the figures and description like reference numerals refer to like features. Embodiments are now described in detail, by way of example only, illustrated by the accompanying drawings in which:

FIG. 1 shows a haptic feedback element controller 100 including a processor 104 and a control state module 106. A first processor input 102 may be connected to the processor 104. The first processor input 102 may also be connected to the control state module 106. An output of control state module may be connected to a second input 108 of the processor 104. The haptic feedback element controller 100 may be incorporated as part of a haptic feedback element system. In operation, the haptic feedback element controller 100 may have a connection 110 to an input of a haptic feedback element amplifier 112. The output of haptic feedback element amplifier 112 may have a connection 114 to a haptic feedback element 116. The haptic feedback element 116 may be for example an eccentric rotating mass vibrator motor, a linear residence actuator, or other electrodynamic haptic feedback element. In operation, the processor may process an input drive signal in accordance with the operating states of either of the haptic feedback element 116 and the haptic feedback element amplifier 112. The operating states may be predicted by the control state module 106 using a model of either or both of the haptic feedback element amplifier 112 and the haptic feedback element 116.

Figure 1:
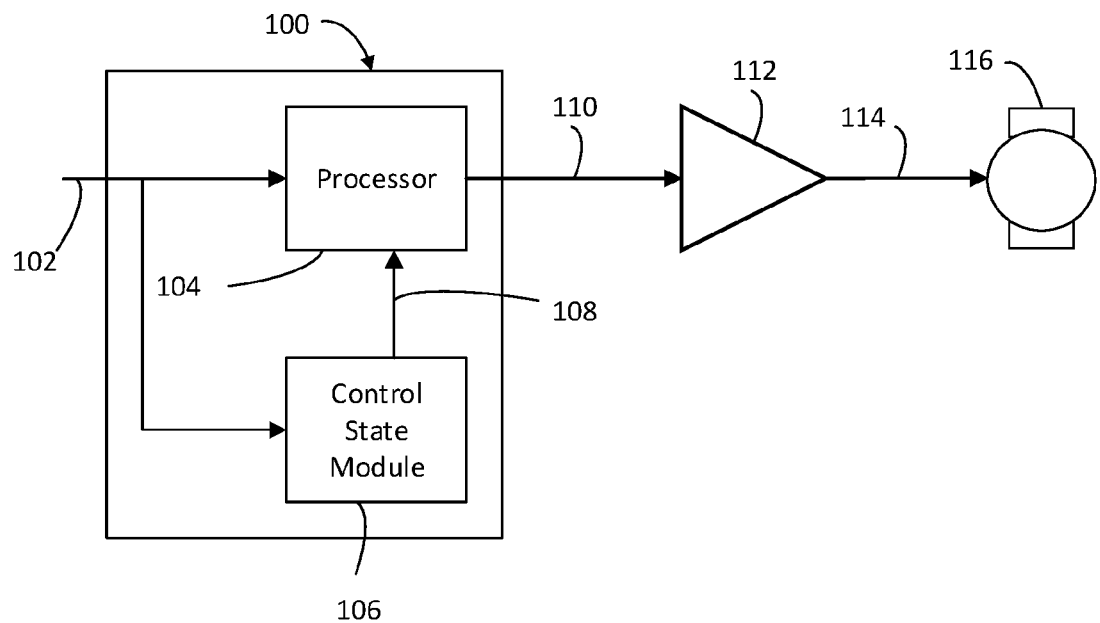
FIG. 1 shows a haptic feedback element controller according to an embodiment incorporated into a haptic feedback system.

The control state module 106 may process the input signal 102 and estimate one or more operating states from the model. The model may be for example a linear or non-linear feedforward model. The haptic feedback element can be modelled using an electrical equivalent model. Alternatively or in addition the haptic feedback element may be modelled with a thermal model to account for heat dissipation within the motor enclosure and predict the voice coil temperature increase for a given input power level.

Example operating states of the haptic feedback element 116 include the voice coil temperature, the peak power dissipated in the voice coil, the average power dissipated in the voice coil, the displacement of the mass, and the force applied to the mass. Each of these operating states may have limits defined by the manufacturer of the haptic feedback element. Example operating states of the haptic feedback element amplifier include the peak drive current, the peak output voltage, the peak power consumption, and the average power consumption. If one or more of these operating states exceeds a maximum desired value, the processor may for example attenuate the amplitude of one or more frequencies of the input signal until the operating state value is at or below the maximum value. The frequencies of the input signal may include any frequencies in the range from zero (DC) to several hundred Hertz. Alternatively if all monitored operating state parameters are below a maximum value, the processor may increase the amplitude of one or more frequency components of the input signal to for example maximise the haptic force generated by the haptic feedback element 116.

The inventor of the present application has realised that by monitoring one or more operating states of the haptic feedback element 116 and/or the haptic feedback element driver 112, haptic feedback element may be driven up to its mechanical and thermal limits without reducing the lifetime of the haptic feedback element. This allows for example either a smaller haptic feedback element to be used to generate a given level of haptic feedback. In other examples this allows certain types of haptic feedback element to be used in unintended ways. For example, the haptic feedback element controller 100 may allow a linear resonance actuator (LRA) to be used as an audio output device to supplement other loudspeakers included in an audio system in a mobile device. Haptic feedback elements such as LRA are intentionally designed to operate at a single drive frequency, typically with corresponding to the mechanical resonance frequency where the LRA efficiency (Newton/Watt) is the highest. The haptic feedback element controller of the present disclosure may allow the LRA to be driven at a significantly higher drive voltage than its intended nominal design, which allows the LRA to be used for example to generate a broader range of frequencies. An LRA system including the haptic feedback element controller may then for example be able to generate more complex haptic patterns, or to generate bass tones in accordance with the music being reproduced on a loudspeaker, thereby effectively acting as a subwoofer in an audio system.

In alternative examples, the control state module 106 may be coupled to either or both of the output 110 of the processor 104, and the output 114 of the haptic feedback element amplifier 112. In these examples, the control state module 106 may determine one or more operating states from a direct measurement of the voltage and/or current of signals at those points instead of a model. Alternatively, the direct measurement of voltage and/or currents may be used to update the parameters of a feedforward model to improve the accuracy of the estimate.

The haptic feedback controller 100 may be implemented in hardware, software or a combination of hardware and software. For example the processor 104 and the control state module 106 may be implemented in logic hardware, or software implemented on a digital signal processor (DSP). The haptic feedback element amplifier 112 may for example be implemented as a class-D amplifier.

Figure 2:
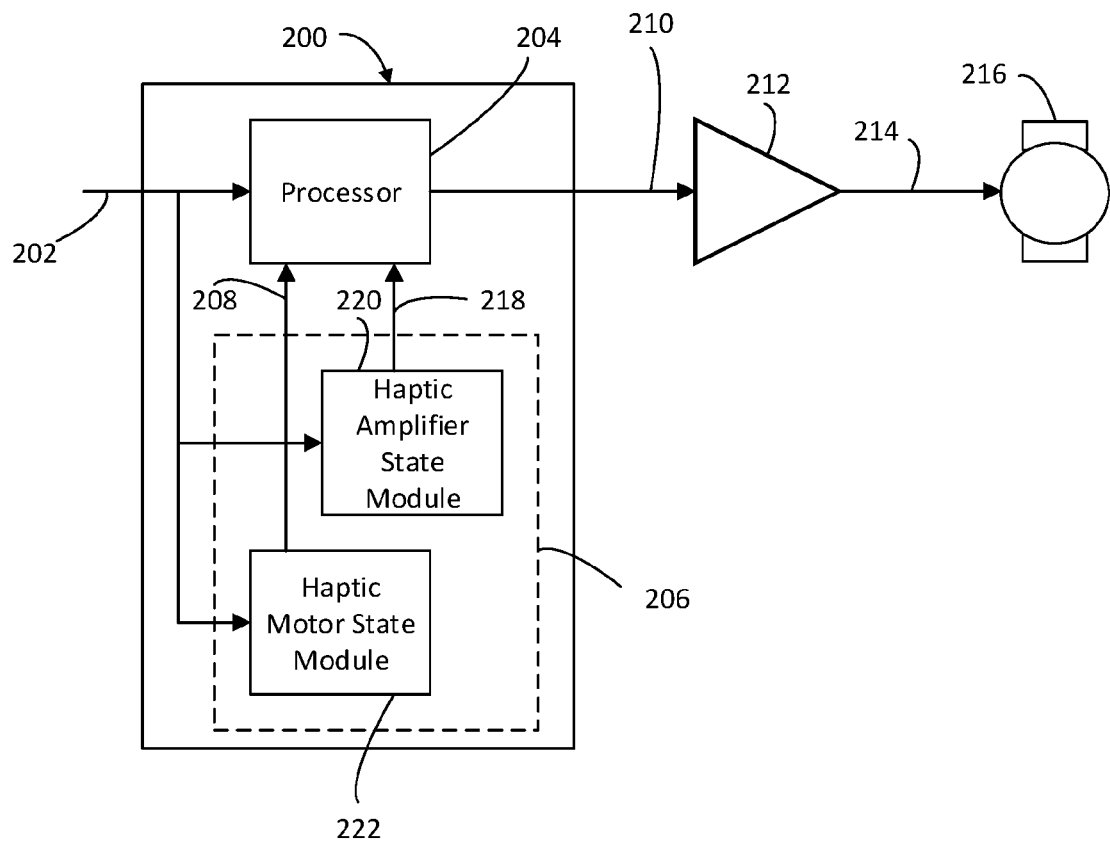
FIG. 2 illustrates a haptic feedback element controller according to an embodiment incorporated into a haptic feedback system

FIG. 2 shows a haptic feedback element controller 200 including a processor 204, a haptic amplifier state module 220, and a haptic motor state module 222. The haptic amplifier state module 220, and the haptic motor state module 222 may be considered as a control state module 206. A first processor input 202 may be connected to the processor 204. The first processor input 202 may be connected to the haptic amplifier state module 220. The first processor input 202 may be connected to the haptic motor state module 222. An output of the haptic motor state module 222 may be connected to a second input 208 of the processor 204. An output of the haptic amplifier state module 220 may be connected to a third input 218 of the processor 204. In some examples, the second processor input 208 and the third processor input 218 may be considered as a single control input connected to the respective state modules via a bus connection. The haptic feedback element controller 200 may be incorporated as part of a haptic feedback element system including a haptic feedback element amplifier 212 and a haptic feedback element 216. In operation, the haptic feedback element controller 200 may have a connection 210 to an input of a haptic feedback element amplifier 212. The output of haptic feedback element amplifier 212 may have a connection 214 to a haptic feedback element 216. The haptic feedback element 216 may be for example an eccentric rotating mass vibrator motor, a linear resonant actuator, or other electrodynamic haptic feedback element. In operation, the processor 202 may process an input drive signal in accordance with the operating states of either of the haptic feedback element 216 and the haptic feedback element amplifier 212.

The processor 204 may output a processed signal to the haptic feedback element amplifier 212 which may be a class D amplifier. The haptic feedback element amplifier 212 may have a fixed or variable gain. In some examples the haptic feedback amplifier 212 may have a unity gain.

The haptic amplifier state module 220 may process the input signal 202 and estimate one or more operating states from a haptic amplifier state feedforward model which may be linear or non-linear. For example, the haptic amplifier state module 220 may estimate values of one or more operating parameters of the haptic feedback element amplifier of the peak drive current, the peak output voltage, the peak power consumption, and the average power consumption of the haptic feedback element amplifier 212.

The haptic motor state module 222 may process the input signal 202 and estimate one or more operating states from a haptic motor state feedforward model which may be linear or non-linear. For example the haptic motor state module 222 may estimate values of one or more of the operating state parameters of the haptic feedback element 216. The operating parameters may include the resonant frequency, the voice coil temperature, the peak power dissipated in the voice coil, the average power dissipated in the voice coil, the displacement of the mass, and the force applied to the mass of the haptic feedback element 216.

If one or more of these operating states exceeds a maximum desired value, the processor may for example attenuate the amplitude of one or more frequencies of the input signal until the operating state value is at or below the maximum value. The frequencies of the input signal may include any frequencies in the range from zero (DC) to several hundred hertz. Alternatively if all monitored operating state parameters are below a maximum value, the processor 204 may increase the amplitude of one or more frequency components of the input signal to, for example, maximise the haptic force generated by the haptic feedback element 216. A haptic driver including the haptic feedback element controller 200 in combination with the haptic feedback element amplifier 212 may optimally drive the haptic feedback element to its mechanical and thermal limits without lifetime reduction.

Figure 3:
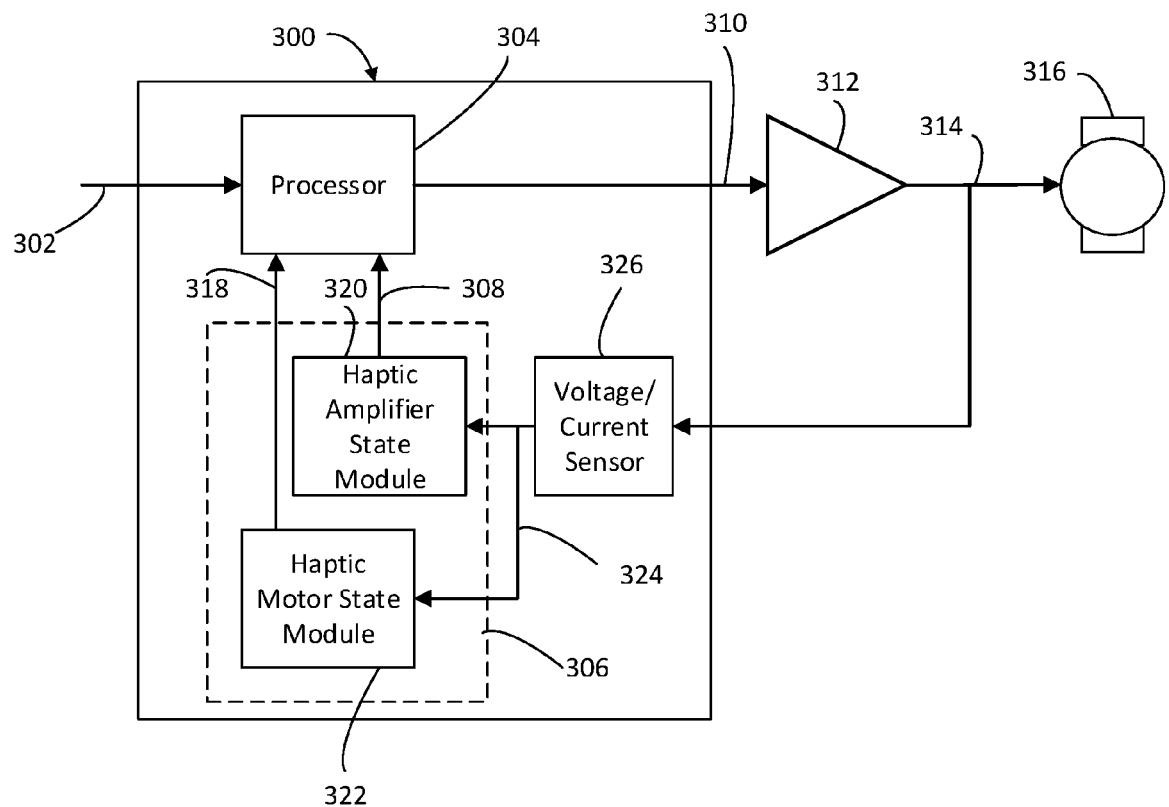
FIG. 3 shows a haptic feedback element controller according to an embodiment incorporated into a haptic feedback system.

FIG. 3 shows a haptic feedback element controller 300 including a processor 304, a haptic amplifier state module 320, a haptic motor state module 322, and a voltage and/or current sensor 326. The haptic amplifier state module 320, and the haptic motor state module 322 may be considered as a control state module 306. A first processor input 302 may be connected to the processor 304. An output 324 of the voltage and/or current sensor 326 may be connected to an input of the haptic amplifier state module 320. An output 324 of the voltage and/or current sensor 326 may be connected to an input of the haptic motor state module 322. An output of the haptic motor state module 322 may be connected to a second input 308 of the processor 304. An output of the haptic amplifier state module 320 may be connected to a third input 318 of the processor 304. In some examples, the second processor input 308 and the third processor input 318 may be considered as a single control input connected to the respective state modules via a bus connection. The haptic feedback element controller 300 may be incorporated as part of a haptic feedback element system including a haptic feedback element amplifier 312 and a haptic feedback element 316. In operation, the haptic feedback element controller 300 may have a connection 310 to an input of a haptic feedback element amplifier 312. The output of haptic feedback element amplifier 312 may have a connection 314 to a haptic feedback element 316 and an input of the voltage and/or current sensor 326. The haptic feedback element 316 may be for example an eccentric rotating mass vibrator motor, a linear residence actuator, or other electrodynamic haptic feedback element. In operation, the processor 302 may process an input drive signal in accordance with the operating states of either of the haptic feedback element 316 and the haptic feedback element amplifier 312.

The processor 302 may output a processed signal to the haptic feedback element amplifier 312 which may be a class D amplifier. The haptic feedback element amplifier 312 may have a fixed or variable gain. In some examples the haptic feedback amplifier 312 may have a unity gain.

In operation, the haptic feedback element controller 300 may determine one or more operating state parameters calculated from a measurement of either the voltage and/or current detected by the voltage and/or current sensor 326. For example, by monitoring the voltage and/or current across the terminals of the haptic feedback element 316, the impedance due to the motion of the haptic feedback element 316, which may also be referred to as the motional impedance, may be determined from the voltage and consequently the back-electromotive force (back-EMF) by the haptic motor state module 322. By determining the back-EMF, the motor displacement and the corresponding force applied may be determined for haptic feedback elements such as linear resonance actuators. This in turn may give an estimate of the stiffness K of the spring in a linear residence actuator. An estimate of K may in turn give an indication of how rapidly a spring in a linear resonant actuator is deteriorating, that is to say how fast the linear residence actuator may be ageing. If a measurement of K indicates that the stiffness is either increasing or decreasing with respect to its expected nominal value, then the haptic feedback element controller 300 may apply additional attenuation to the input signal thereby reducing the force applied to the spring in a linear residence actuator, which may prolong its life.

Other parameters such as the Q factor and resonant frequency of a haptic feedback element such as a linear resonant actuator may also be determined from the back-EMF.

Alternatively or in addition, the measured voltage and/or current may be used by the haptic motor state module 322 to determine a value of the voice coil DC resistance of a haptic feedback element 316. The measured voice coil DC resistance value may in turn be used to estimate the voice coil temperature. In some examples, the voice coil DC resistance may be determined by measuring the attenuation of a reference signal, or pilot tone having a known constant amplitude and frequency, which may be generated by the processor 404 and mixed with the input signal received by the processor 304. In examples where the haptic feedback element 316 is a linear resonant actuator, the resonant frequency may be a frequency which is different to the resonant frequency of the linear resonant actuator. Since the impedance at the resonant frequency of a LRA may be significantly different to the DC resistance, by using a frequency which is significantly different, for example more than an octave below or above the resonant frequency, a value of DC resistance of the voice coil may be obtained.

Alternatively or in addition, the measured voltage and/or current may be used by the haptic amplifier state module 322 to calculate the output current and output voltage of the haptic feedback element amplifier 312, and consequently to determine a value of power consumption of the haptic feedback element amplifier 312, which may be an average power value, or a peak power value.

If one or more of these operating states exceeds a maximum desired value, the processor 304 may for example attenuate the amplitude of one or more frequencies of the input signal until the operating state value is at or below the maximum value. The frequencies of the input signal may include any frequencies in the range from zero (DC) to several hundred hertz. Alternatively if all monitored operating state parameters are below a maximum value, the processor 304 may increase the amplitude of one or more frequency components of the input signal to, for example, maximise the haptic force generated by the haptic feedback element 316. A haptic driver including the haptic feedback element controller 300 in combination with the haptic feedback element amplifier 312 may optimally drive the haptic feedback element to its mechanical and thermal limits without lifetime reduction.

The haptic feedback controller 300 may be implemented in hardware, software or a combination of hardware and software. For example the processor 304, the haptic amplifier state module 320 and the haptic motor state module 322 may be implemented in logic hardware, or software implemented on a digital signal processor (DSP). The voltage and/or current sensor 326 may be implemented as a hardwire circuit. The haptic feedback element amplifier 312 may for example be implemented as a class-D amplifier.

Figure 4:
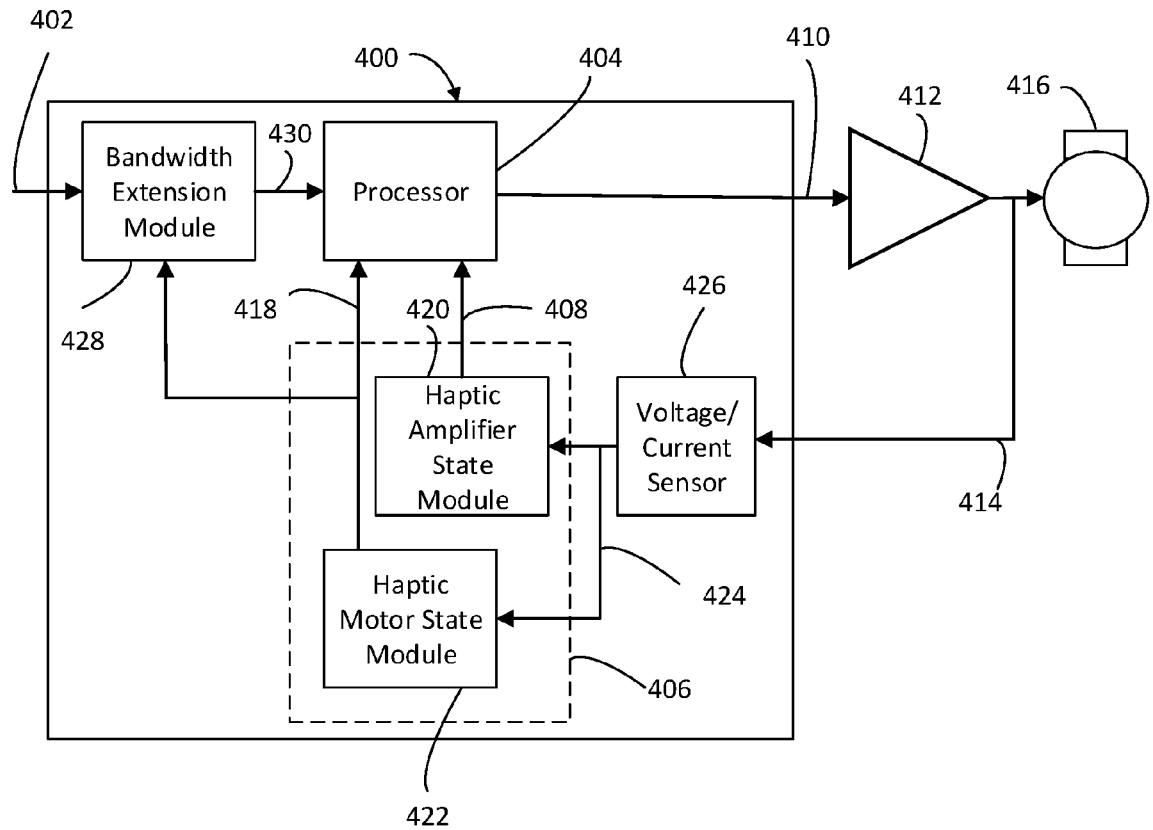
FIG. 4 illustrates a haptic feedback element controller according to an embodiment incorporated into a haptic feedback system.

FIG. 4 shows a haptic feedback element controller 400 including a processor 404, a haptic amplifier state module 420, a haptic motor state module 422, a voltage and/or current sensor 426, and a bandwidth extension module 428. The haptic amplifier state module 420, and the haptic motor state module 422 may be considered as a control state module 406. An input 402 for receiving an input signal may be connected to a bandwidth extension module 428. An output of the bandwidth extension module 428 may be connected to a first input 430 of a processor 404. An output 424 of the voltage and/or current sensor 426 may be connected to an input of the haptic amplifier state module 420. An output 424 of the voltage and/or current sensor 426 may be connected to an input of the haptic motor state module 422. An output of the haptic motor state module 422 may be connected to a second input 408 of the processor 404. An output of the haptic amplifier state module 420 may be connected to a third input 418 of the processor 404. In some examples, the second processor input 408 and the third processor input 418 may be considered as a single control input connected to the respective state modules via a bus connection. The haptic feedback element controller 400 may be incorporated as part of a haptic feedback element system including a haptic feedback element amplifier 412 and a haptic feedback element 416. In operation, the haptic feedback element controller 400 may have a connection 410 to an input of a haptic feedback element amplifier 412. The output of haptic feedback element amplifier 412 may have a connection 414 to a haptic feedback element 416 and an input of the voltage and/or current sensor 426. The haptic feedback element 416 may be for example an eccentric rotating mass vibrator motor, a linear residence actuator, or other electrodynamic haptic feedback element. In operation, the processor 404 may process an input drive signal in accordance with the operating states of either of the haptic feedback element 416 and the haptic feedback element amplifier 412.

The processor 404 may output a processed signal to the haptic feedback element amplifier 412 which may be a class D amplifier. The haptic feedback element amplifier 412 may have a fixed or variable gain. In some examples the haptic feedback amplifier may have a unity gain 412.

In operation, the haptic feedback element controller 400 may determine one or more operating state parameters calculated from a measurement of either the voltage and/or current detected by the voltage and/or current sensor 426 similarly as described in other embodiments. If one or more of these operating states exceeds a maximum desired value, the processor 404 may for example attenuate the amplitude of one or more frequencies of the input signal until the operating state value is at or below the maximum value. Alternatively if all monitored operating state parameters are below a maximum value, the processor 404 may increase the amplitude of one or more frequency components of the input signal to, for example, maximise the haptic force generated by the haptic feedback element 416. A haptic driver including the haptic feedback element controller 400 in combination with the haptic feedback element amplifier 412 may optimally drive the haptic feedback element to its mechanical and thermal limits without lifetime reduction and so may provide both signal boosting and protection functions for the haptic feedback element.

The processor 404 may apply filtering or compression to the input signal to alter the amplitude of one or more frequency components. The bandwidth extension module 428 may apply filtering to the input signal received on input 402 to effectively increase the bandwidth of the response of a connected haptic feedback element 416 such as a linear resonant actuator. The bandwidth extension module 428 may typically extend the bandwidth symmetrically either side of the resonance frequency of a linear residence actuator. The haptic motor state module 422 may determine the resonance frequency of a haptic feedback element 416, and the bandwidth extension module 428 may adapt the pass band in response to the measured resonance frequency changing. The bandwidth extension module 428 may for example apply filtering whereby frequency components at the resonant frequency are attenuated, and frequency components outside the resonant frequency are boosted.

The processor 404 may then apply further boosting if the operating parameter values, or the predicted operating parameter values are not exceeded. The effect of this may be that the haptic feedback element controller 400 may apply much higher than nominal control voltages to a connected haptic feedback element 416 for frequencies outside the resonant frequency of the haptic feedback element 416, thereby increasing the effective bandwidth while at the same time controlling the input signal such that maximum safe parameter limits are not exceeded. Consequently the haptic feedback element controller 400 may extend the reproduction bandwidth so as to allow the safe reproduction of a plurality of frequency components. This may allow a haptic feedback element such as a linear residence actuator to also be used for audio reproduction including for example speech reproduction in addition to its intended purpose of generating haptic feedback.

Figure 5:
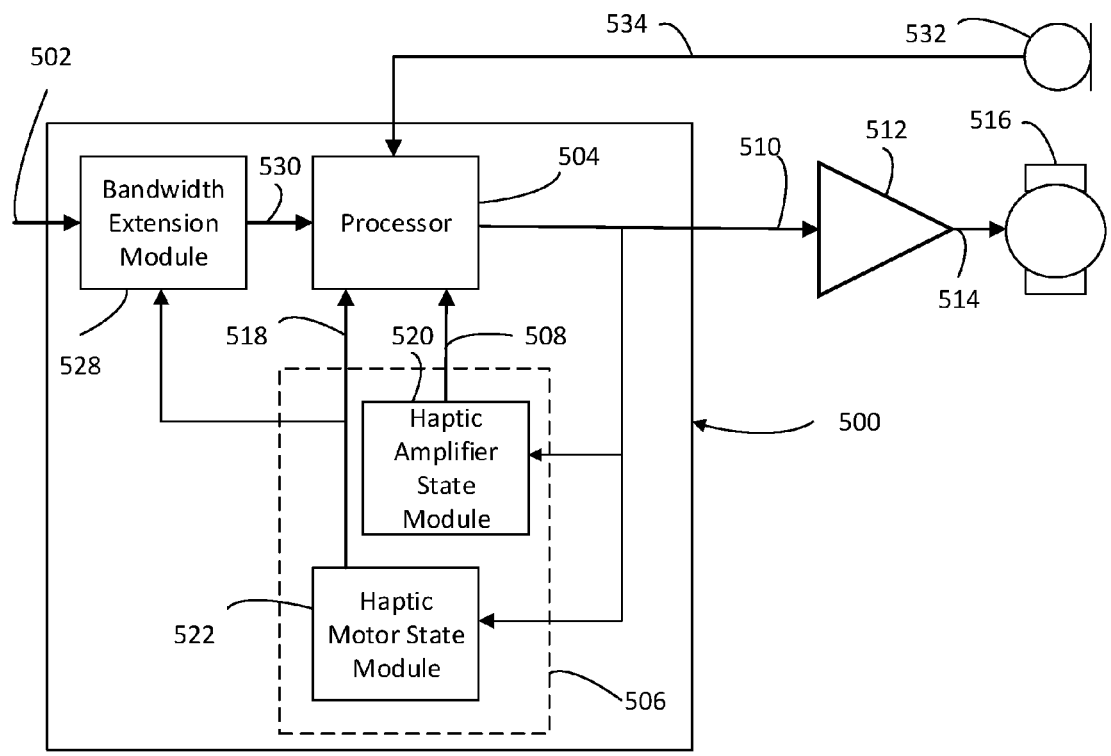
FIG. 5 shows a haptic feedback element controller according to an embodiment incorporated into a haptic feedback system.

FIG. 5 shows a haptic feedback element controller 500 including a processor 504, a haptic amplifier state module 520, a haptic motor state module 522, and a bandwidth extension module 528. The haptic amplifier state module 520, and the haptic motor state module 522 may be considered as a control state module 506. The bandwidth extension module 528 may have an input 502 for receiving a signal. An output of the bandwidth extension module 528 may be connected to a first input 530 of the processor 504. An output 510 of the processor 504 may be connected to the haptic amplifier state module 520. An output 510 of the processor 504 may be connected to the haptic motor state module 522. An output of the haptic motor state module 522 may be connected to a second input 518 of the processor 504. An output of the haptic amplifier state module 520 may be connected to a third input 508 of the processor 504. The processor 504 may have a microphone input 534. In some examples, the second processor input 518 and the third processor input 508 may be considered as a single control input connected to the respective state modules via a bus connection. The haptic feedback element controller 500 may be incorporated as part of a haptic feedback element system including a haptic feedback element amplifier 512, a haptic feedback element 516, and a microphone 532.

In operation, the haptic feedback element controller 500 may have a connection 510 to an input of a haptic feedback element amplifier 512. The output of haptic feedback element amplifier 512 may have a connection 514 to a haptic feedback element 516. The microphone 532 may be connected to the processor microphone input 534. The haptic feedback element 516 may be for example an eccentric rotating mass vibrator motor, a linear resonant actuator, or other electrodynamic haptic feedback element. In operation, the processor 502 may process an input drive signal in accordance with the operating states of either or both of the haptic feedback element 516 determined by the haptic motor state module 522 and the haptic feedback element amplifier 512 determined by the haptic amplifier state module 520.

The processor 504 may output a processed signal to the haptic feedback element amplifier 512 which may be a class D amplifier. The haptic feedback element amplifier 512 may have a fixed or variable gain. In some examples the haptic feedback amplifier may have a unity gain 512.

The haptic amplifier state module 520 may process signal received on input 502 and estimate one or more operating states from a haptic amplifier state feedforward model based on the processed signal output on processor output 510 which may be linear or non-linear. For example, the haptic amplifier state module 520 may estimate values of one or more operating parameters of the haptic feedback element amplifier of the peak drive current, the peak output voltage, the peak power consumption, and the average power consumption of the haptic feedback element amplifier 512.

The haptic motor state module 522 may process the input signal 502 and estimate one or more operating states from a haptic motor state feedforward model based on the processed signal output on processor output 510 which may be linear or non-linear. For example the haptic motor state module 522 may estimate values of one or more of the operating state parameters of the haptic feedback element 516. The operating parameters may include the resonant frequency, the voice coil temperature, the peak power dissipated in the voice coil, the average power dissipated in the voice coil, the displacement of the mass, and the force applied to the mass of the haptic feedback element 516.

The processor 504 may apply filtering or compression to the input signal to alter the amplitude of one or more frequency components. The bandwidth extension module 528 may apply filtering to the input signal received on input 502 to effectively increase the bandwidth of the response of a connected haptic feedback element 516 such as a linear resonant actuator. The effective increase in bandwidth may be for example between 100 and 400 Hz. The bandwidth extension module 528 may typically extend the bandwidth symmetrically either side of the resonance frequency of a linear resonant actuator. The haptic motor state module 522 may determine the resonance frequency of a haptic feedback element 516, and the bandwidth extension module 528 may adapt the pass band in response to the measured resonance frequency changing. The bandwidth extension module 528 may for example apply filtering whereby frequency components at the resonant frequency are attenuated, and frequency components outside the resonant frequency are boosted.

The processor 504 may then apply further boosting if the operating parameter values, or the predicted operating parameter values are not exceeded. The effect of this may be that the haptic feedback element controller 500 may apply much higher than nominal control voltages to a connected haptic feedback element 516 for frequencies outside the resonant frequency of the haptic feedback element 516, thereby increasing the effective bandwidth while at the same time controlling the input signal such that maximum safe parameter limits are not exceeded. Consequently the haptic feedback element controller 500 may extend the reproduction bandwidth so as to allow the safe reproduction of a plurality of frequency components. This may allow a haptic feedback element such as a linear residence actuator to also be used for audio reproduction including for example speech reproduction in addition to its intended purpose of generating haptic feedback.

If one or more of these operating states exceeds a maximum desired value, the processor may for example attenuate the amplitude of one or more frequencies of the input signal until the operating state value is at or below the maximum value. The frequencies of the input signal may include any frequencies in the range from zero (DC) to several hundred hertz. Alternatively if all monitored operating state parameters are below a maximum value, the processor 504 may increase the amplitude of one or more frequency components of the input signal to, for example, maximise the haptic force generated by the haptic feedback element 516. A haptic driver including the haptic feedback element controller 500 in combination with the haptic feedback element amplifier 512 may optimally drive the haptic feedback element to its mechanical and thermal limits without lifetime reduction.

The processor 504 may further sample the microphone input and determine any frequencies contained in the microphone signal received via the microphone 532 which are outside the pass band, or the effective pass band of the haptic feedback element 516. If any such frequencies are present, this may indicate unwanted harmonic components, that is to say distortion caused when the haptic feedback element 516 is being driven. In the case where the haptic feedback element 516 is being used as an audio output element, this may result in a reduced perceived audio quality. The processor 504 may therefore for example attenuate the input signal if these unwanted harmonics are detected. Alternatively or in addition, the processor may apply attenuation if these unwanted harmonics are above a certain minimum threshold value. Alternatively, or in addition, the processor 504 may selectively attenuate frequencies in the input signal which may cause the unwanted harmonics.

Figure 6:
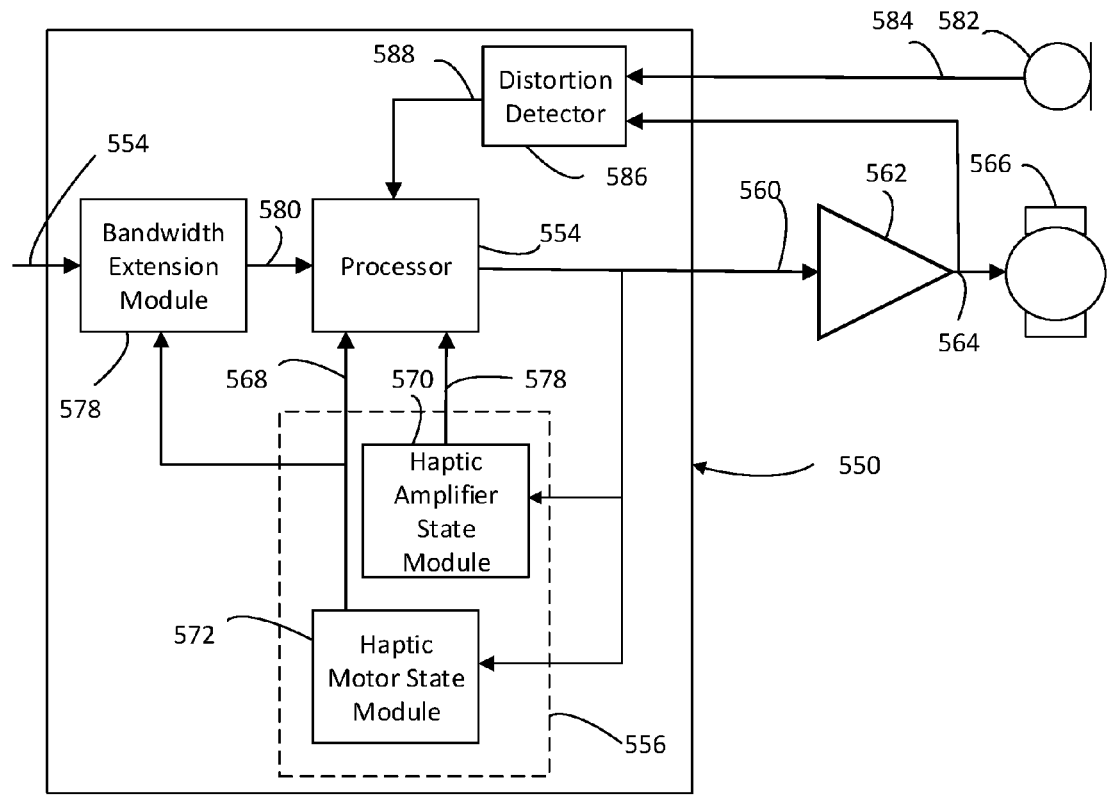
FIG. 6 illustrates a haptic feedback element controller according to an embodiment incorporated into a haptic feedback system.

FIG. 6 shows a haptic feedback element controller 550 including a processor 554, a haptic amplifier state module 570, a haptic motor state module 572, a bandwidth extension module 578 and a distortion detector 586. The haptic amplifier state module 570, and the haptic motor state module 572 may be considered as a control state module 556. The bandwidth extension module 578 may have an input 554 for receiving a signal. The processor 554 may have a first input 580 for receiving a signal from an output of the bandwidth extension module 578. An output 560 of the processor 554 may be connected to the haptic amplifier state module 570. An output 560 of the processor 554 may be connected to the haptic motor state module 572. An output of the haptic motor state module 572 may be connected to a second input 568 of the processor 554. An output of the haptic amplifier state module 570 may be connected to a third input 558 of the processor 554. In some examples, the second processor input 518 and the third processor input 508 may be considered as a single control input connected to the respective state modules via a bus connection. The processor 554 may have a microphone input 588 connected to the output of a distortion detector 586. The microphone input 588 may be suitable for receiving a signal from a microphone or other acoustic transducer.

The haptic feedback element controller 550 may be incorporated as part of a haptic feedback element system including a haptic feedback element amplifier 562, a haptic feedback element 566, and a microphone 582.

In operation, the haptic feedback element controller 550 may have a connection 560 to an input of a haptic feedback element amplifier 562. The output of haptic feedback element amplifier 562 may have a connection 564 to a haptic feedback element 566 and to a first input of the distortion detector 586. The microphone 582 may be connected to a second distortion detector input 584. It will be appreciated that other acoustic transducers may also be used instead of the microphone 582. For example, a speaker may be configured as a microphone and connected to the second distortion detector input 584. By using the speaker configured as a microphone, more of the noise due to mechanical vibrations may be captured then by using a microphone, since the speaker-as-microphone may be more responsive at lower frequencies. The haptic feedback element 566 may be for example an eccentric rotating mass vibrator motor, a linear residence actuator, or other electrodynamic haptic feedback element. In operation, the processor 552 may process an input drive signal in accordance with the operating states of either or both of the haptic feedback element 566 determined by the haptic motor state module 572 and the haptic feedback element amplifier 562 determined by the haptic amplifier state module 570.

The distortion detector 586 may determine a difference between the signal 584 received via the microphone 582 and the signal output of the haptic feedback element 562. This difference may be a measure of the distortion in the signal generated by the haptic feedback element 566. When the haptic feedback element 566 is for example a linear resonant actuator which may be used for audio output in addition to the intended purpose of generating haptic feedback, this distortion may result in a perceived reduction in audio quality. The processor 554 may attenuate the input signal received on the input 580 in response to the level of distortion exceeding a predefined threshold. In other respects, the operation of the haptic feedback controller 550 is similar to that described for haptic feedback controller 500.

The haptic feedback element controllers described may be incorporated into a mobile device, such as a mobile phone, a smart watch, a laptop, a personal digital assistant, a portable medical device, or other portable audio device.

Figure 7:
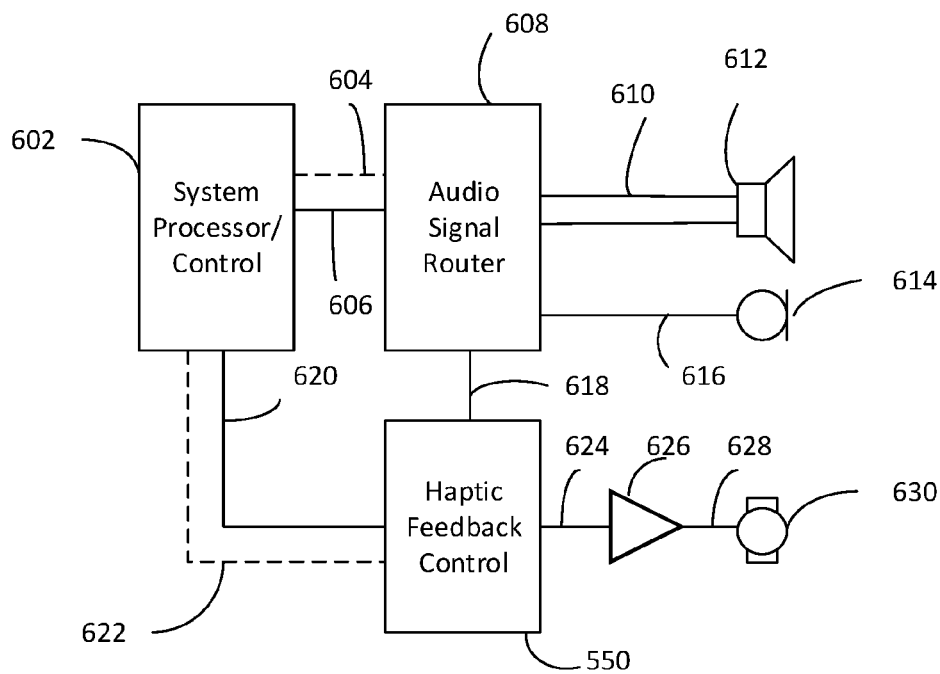
FIG. 7 illustrates a mobile device including a haptic feedback element controller according to an embodiment.

An example of such a mobile device is illustrated in FIG. 7 which shows a mobile phone 600 incorporating the haptic feedback controller 550 described in FIG. 6. The mobile phone 600 may include a system processor 602. The system processor may have a data connection 606 to an audio signal routing and a control connection 604 to the audio signal routers 608. System processor 602 may have a second data connection 620 to the haptic feedback controller 550. System processor 602 may have a control connection 622 to the haptic feedback controller 550. The audio signal router 608 may have a connection 610 to a loudspeaker 612. The audio signal router 608 may have a connection 616 to a microphone 614. The audio signal router 608 may have an output 618 to the haptic feedback controller 550. The output 624 of the haptic feedback controller may have a connection to a haptic feedback element amplifier 626. An output 628 of the haptic feedback element amplifier 626 may be connected to a haptic feedback element 630. System processor 602 of the mobile phone may be the main application processor for the mobile phone 600 which performs the main audio and video processing functions as will be appreciated by the skilled person. The system processor 602 may also control the various operating modes of the mobile phone 600. In a first operating mode, the system processor 602 may enable the haptic feedback controller 550 and transmit a haptic feedback signal on the data line 620 to the haptic feedback controller 550. Haptic feedback controller 550 may process the input signal and output a processed signal on the output 624. This mode of operation may for example be used to enable vibration of the housing (not shown) of the mobile phone 600 in a vibrate mode or silent mode. As previously explained, the haptic feedback controller may maximise the drive signal such that the haptic feedback element 630 is driven to its maximum possible limit while ensuring that maximum operating state parameter is not exceeded. The system processor 602 may also control the audio signal router 608 to route either a microphone input signal from microphone 614 to the haptic feedback controller via the output 618. Alternatively the system processor 602 may route a signal from the speaker 612 when configured as a microphone via the audio signal router 608 to the output 618 of the audio signal router 608. When operating in this mode, the haptic feedback controller 550 may determine a measure of the distortion of the signal generated by the haptic feedback element 630 from either or both of a signal received via the microphone 614, or a signal received via the speaker 612 when configured as a microphone as previously described.

Figure 8:
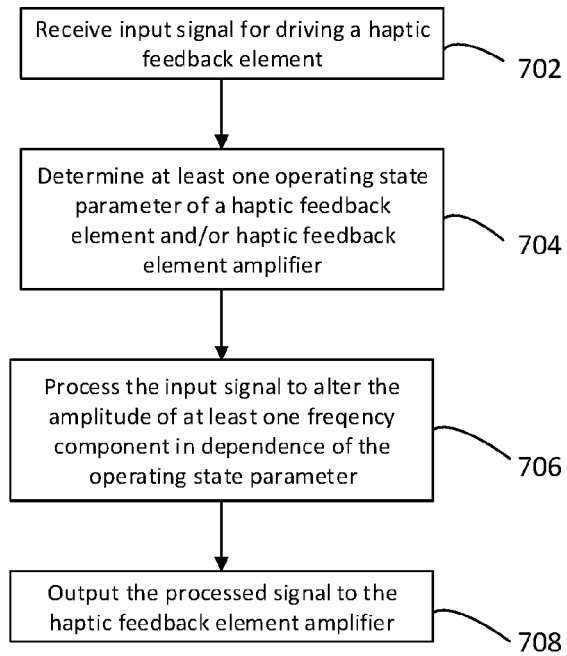
FIG. 8 illustrates a method of controlling a haptic feedback element for a mobile device according to an embodiment.

FIG. 8 shows a method of controlling a haptic feedback element 700. In step 702 an input signal may be received for driving a haptic feedback element. In step 704 at least one operating state parameter may be determined, the operating state parameter relating to either or both of a haptic feedback element, and a haptic feedback element amplifier. In step 706 the input signal may be processed to alter the amplitude of at least one frequency component in dependence of the operating state parameter. In step 708 the process signal may be output to the haptic feedback element amplifier. A haptic feedback element controlled using the method 700 may allow a haptic feedback element to be driven beyond its normal operating parameters without reducing the lifetime of the haptic feedback element.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub combination.

The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. A haptic feedback element controller for a mobile device comprising:
   a processor having a processor output, a first processor input, and a second processor input,
   a control state module having an output coupled to the second processor input and configured to determine at least one operating state parameter of at least one of a haptic feedback element and a haptic feedback element amplifier;
   wherein the processor is configured
      to alter an amplitude of one or more frequency components of an input signal received on the first processor input in dependence of the at least one operating state parameter and to output a processed signal to the haptic feedback element amplifier having an output for coupling to the haptic feedback element;
further comprising a sensor having,
an output coupled to the control state module; and
an input for sensing a voltage and/or current from a haptic feedback element amplifier output; and
wherein the control state module is configured to determine a value of the at least one operating state parameter from the sensed voltage and/or current.

2. The haptic feedback element controller of claim 1 wherein the processor is further configured
to increase the amplitude of one or more frequency components of an input signal in response to the at least one operating state parameter being less than a first predetermined value and
to decrease the amplitude of one or more frequency components of an input signal in response to the at least one operating state parameter being greater than a second predetermined value.

3. The haptic feedback element controller of claim 1 further comprises a bandwidth extension module coupled to the processor,
wherein the bandwidth extension module is configured to extend the effective pass-band of the haptic feedback element to include frequencies above and below a resonant frequency of the haptic feedback element.

4. The haptic feedback element controller of claim 3 wherein the bandwidth extension module is further configured to adapt the effective pass-band in response to a change in resonant frequency of the haptic feedback element.

5. The haptic feedback element controller of claim 3 wherein the processor further comprises a processor acoustic transducer input and
wherein the processor is configured to alter the input signal in response to frequency components outside the effective pass-band of the haptic feedback element being detected in a signal received via an acoustic transducer coupled to the processor acoustic transducer input.

6. The haptic feedback element controller of claim 5 further comprising a distortion detector having
a first input for receiving a signal from a haptic feedback element amplifier,
a second input for receiving a signal from an acoustic transducer and
an output coupled to the processor acoustic transducer input, and
wherein the distortion detector is operable to generate an output signal from a difference between an acoustic transducer signal and the haptic feedback element amplifier signal.

7. The haptic feedback element controller of claim 1 wherein the haptic element operating state parameter comprises at least one of: a resonant frequency, a peak amplifier current, a peak output voltage, a peak amplifier power, an average amplifier power, haptic element voice coil temperature, a peak power dissipated in the haptic element voice coil, a displacement of a haptic element mass, or a force applied to the haptic element mass.

8. The haptic feedback element controller of claim 1:
wherein the control state module is configured
to determine the voice coil DC resistance of the haptic feedback element from the determined voltage and/or current and
to determine a value of the voice coil temperature from the voice coil DC resistance.

9. The haptic feedback element controller of claim 5,
wherein the processor is configured to generate a constant frequency and constant amplitude signal having a frequency other than the resonant frequency of the haptic feedback element and
wherein the control state module is configured
to determine the voice coil DC resistance of the haptic feedback element from the determined voltage and/or current and
to determine a value of the voice coil temperature from the voice coil DC resistance.

10. The haptic feedback element controller of claim 7,
wherein the processor is configured to alter the amplitude of one or more frequency components of an input signal received on the first processor input to limit the force to a predetermined maximum value.

11. The haptic feedback element controller of claim 7 wherein the control state module further comprises
a haptic feedback element amplifier state module configured to determine the value of at least one of peak amplifier current, peak output voltage, peak amplifier power, and average amplifier power and
a haptic feedback element state module configured to determine the value of at least one of resonant frequency, voice coil temperature, peak power dissipated in the voice coil, mass displacement, and force applied to the mass.

12. The haptic feedback element controller of claim 1 wherein the control state module is coupled to the first processor input and further comprises a model of at least one of the haptic feedback element and the haptic feedback element amplifier for calculating an estimated value of the at least one operating parameter from an input signal received on the first processor input.

13. A mobile device comprising
the haptic feedback element controller of claim 1,
a haptic feedback element amplifier, and
a haptic feedback element,
wherein the haptic feedback element controller is coupled to the haptic feedback element amplifier input and the haptic feedback element is coupled to the haptic feedback element amplifier output.

14. A haptic feedback element controller for a mobile device comprising:
a processor having a processor output, a first processor input, and a second processor input,
a control state module having an output coupled to the second processor input and configured to determine at least one operating state parameter of at least one of a haptic feedback element and a haptic feedback element amplifier;
wherein the processor is configured
to alter an amplitude of one or more frequency components of an input signal received on the first processor input in dependence of the at least one operating state parameter and
to output a processed signal to the haptic feedback element amplifier having an output for coupling to the haptic feedback element;
wherein the haptic element operating state parameter comprises at least one of: a peak amplifier current, a peak output voltage, a peak amplifier power, an average amplifier power, haptic element voice coil temperature, a peak power dissipated in the haptic element voice coil, a displacement of a haptic element mass, or a force applied to the haptic element mass.

15. A haptic feedback element controller for a mobile device comprising:

a processor having a processor output, a first processor input, and a second processor input, a control state module having an output coupled to the second processor input and configured to determine at least one operating state parameter of at least one of a haptic feedback element and a haptic feedback element amplifier;

wherein the processor is configured to alter an amplitude of one or more frequency components of an input signal received on the first processor input in dependence of the at least one operating state parameter and to output a processed signal to the haptic feedback element amplifier having an output for coupling to the haptic feedback element; and wherein the control state module is coupled to the first processor input and further comprises a model of at least one of the haptic feedback element and the haptic feedback element amplifier for calculating an estimated value of the at least one operating parameter from an input signal received on the first processor input.

* * * * *